Aug. 9, 1955 R. A. BEERS 2,715,180

NARROW-BAND COMMUNICATION RECEIVERS AND THE LIKE

Filed Nov. 20, 1951

INVENTOR
Roy A. Beers
BY H. O. Mueston
ATTORNEY 2,715,180
Patented Aug. 9, 1955

2,715,180

NARROW-BAND COMMUNICATION RECEIVERS AND THE LIKE

Roy A. Beers, Audubon, N. J., assignor to Radio Corporation of America, a corporation of Delaware Application November 20, 1951, Serial No. 257,343
7 Claims. (Cl. 250—20)

The present invention relates to narrow-band communications receivers and the like, and more particularly to high-frequency communications receivers of the mobile or multiple channel type operating in a band of high signal frequencies, with relatively narrow-band signal channel separation.

With narrow-band (60 kc.) signal channel operation at relatively high frequencies such as the communications band between 152 and 174 megacycles, adjacent channel interference is a major problem, particularly with respect to third order heterodyning of two interfering signals when one signal is on the adjacent channel (±60 kc.) and the other on the alternate channel (±120 kc.). The resultant beat frequency is the same as the carrier frequency, and the normal attenuation to this spurious response is of a low order such as 47 db, although a receiver must have a 100-db adjacent channel attenuation and 85-db attenuation to single frequency spurious responses to be fully effective.

In high-frequency, narrow-band communications receivers, it is desirable to provide a double heterodyne using a first and a second signal mixer, thereby to develop a relatively low, final intermediate frequency for more efficiently attaining desired selectivity and amplification. In addition, at least one stage of radio frequency amplification is employed before the first signal mixer. In a frequency modulation receiver to which the invention more particularly relates, the low intermediate frequency amplifier is followed by first and second limiter stages before the audio frequency discriminator.

It is an object of this invention to provide an improved high-frequency, narrow-band, communications type signal receiving system which permits operation with relatively narrow frequency band separation between signal channels to be received, while at the same time being substantially immune from spurious responses resulting from intermodulation type of interference.

It is a further object of this invention to provide an improved high-frequency signal receiving system of the communications type, which provides effective automatic gain control of signal amplifier and mixer stages thereof by signal-derived potentials resulting from a high degree of signal selection, whereby intermodulation interference is reduced to a minimum and close adjacent channel operation in high frequency bands, without undesired spurious response, is made practically possible.

It is also an object of this invention to provide an improved high-frequency, narrow-band, signal receiving system or the like, which is adapted to respond to or capture a desired signal when there are two strong interfering signals present on adjacent and alternate channels which normally produce a third spurious signal of the desired frequency. Such response is generally due to fourth order curvature of the mixer tube plate current characteristic or third order curvature of the R.-F. amplifier plate current characteristic.

In accordance with the invention, the system comprises a signal conveying channel having a degree of gain and selectivity, coupled with threshold response at two different signal levels, such that control voltages are developed for automatic gain control of both the R.-F. amplifier and at least the first mixer stage wholly in response to a desired signal. The AGC voltages are applied to the R.-F. amplifier and first mixer stage in such manner that for very weak signals the receiving system may have full sensitivity, since a reduction in maximum sensitivity for such signals cannot be permitted, particularly in communications type receivers.

It is desired to limit the R.-F. gain at times to reduce intermodulation interference, which increases substantially as the third power of the R.-F. gain. Thus, in accordance with the invention, when the desired signal is above a certain threshold value, it produces an AGC control voltage which cuts off or reduces the effective gain of the R.-F. amplifier tube or tubes, as well as that of the first mixer tube, and enables the desired signal to control or capture the receiving system, for the reason that the two undesired signals, each alone, cannot produce a control voltage.

In order to distinguish between intermodulation interference and cross-modulation, which sometimes occurs in amplitude modulation systems, intermodulation production can be understood by the following example:

In the 152–174 mc. signal band, communication channels are available for assignment every 60 kc., if they can be utilized. If F1 be the desired signal on 152.27 mc., for example, and F2 be the adjacent channel signal on 152.33 mc., and F3 be the alternate signal channel on 152.39 mc., then $$2\times 152.33 = 304.66 - 152.39 = 152.27$$

which is the desired frequency.

It can also happen that the mixing of five times the frequency of a signal that is four channels removed, minus three times a signal that is six channels removed, may cause interference on the desired frequency channel. This intermodulation type of interference makes adjacent channel operation practically impossible in the higher frequency bands, such as those herein referred to, where a large amount of selectivity to the R.-F. interference is unobtainable unless other means are employed to enable the desired signal to capture or control the signal receiving system.

It is a further and primary object of this invention, therefore, to provide a high frequency, narrow band multichannel signal receiving system which is provided with additional selective gain control means for enabling a desired signal to control the receiving system, without intermodulation intereference of the character referred to.

Further in accordance with the invention, a grounded-grid type triode R.-F. amplifier and a triode first signal mixer are provided with AGC voltages which are derived after considerable selectivity, and applied in correct proportions to the control grids of the R.-F. amplifier and mixer stages, so that the operating characteristics are optimum for this intermodulation type of interference. At the same time, the first mixer stage is prevented from overloading. The main intermodulation interference which is particularly prevented or guarded against, is the type hereinbefore referred to, which results from twice the signal of an adjacent channel frequency beating with a signal of an alternate channel frequency to produce interference at the desired signal frequency.

In order to obtain a high degree of selectivity at the control points for the AGC potentials, highly selective band-pass filter circuits are provided in connection with a low intermediate-frequency amplifier, preferably at the signal input end and between successive stages thereof, and the AGC potential for the R.-F. amplifier is derived from the first limiter stage, or like advanced point in the signal path, and fed back to the R.-F. amplifier or amplifiers. This control voltage as derived is designed to have a threshold value corresponding to a desired signal level and is most readily obtained by having the first limiter grid draw current at that point.

In addition, and preceding the point of higher signal voltage represented by the first limiter, such as at one of the intermediate amplifier stages, a second AGC voltage is derived in a similar manner, and applied to the first mixer stage, so that a considerable increase in signal level is required to limit the gain of the first mixer, as compared with that of the first or second R.-F. amplifier stages.

The selectivity at the first operative AGC point in the system, as at the first limiter, is such that the selectivity curve may by way of example, have a 30-kc. band width at 6 db attenuation, and 60 kc. band width at 100 db attenuation. Further selectivity is also obtained in the coupling between the R.-F. amplifier and the first mixer and also between the first and second mixer stages. The high and low intermediate-frequency signals are generated by means of a suitable local oscillator providing frequency multiplication.

By means of the invention, the signal intensity of a desired signal required to capture or control a receiving system may be only a small percentage of or a small number of db above the receiver sensitivity, and relatively low with respect to the signal intensity of each of the two interfering signals in db above the receiver sensitivity.

The invention will further be understood from the following description, when considered in connection with the accompanying drawing, and its scope is pointed out in the appended claims.

Figure 1:
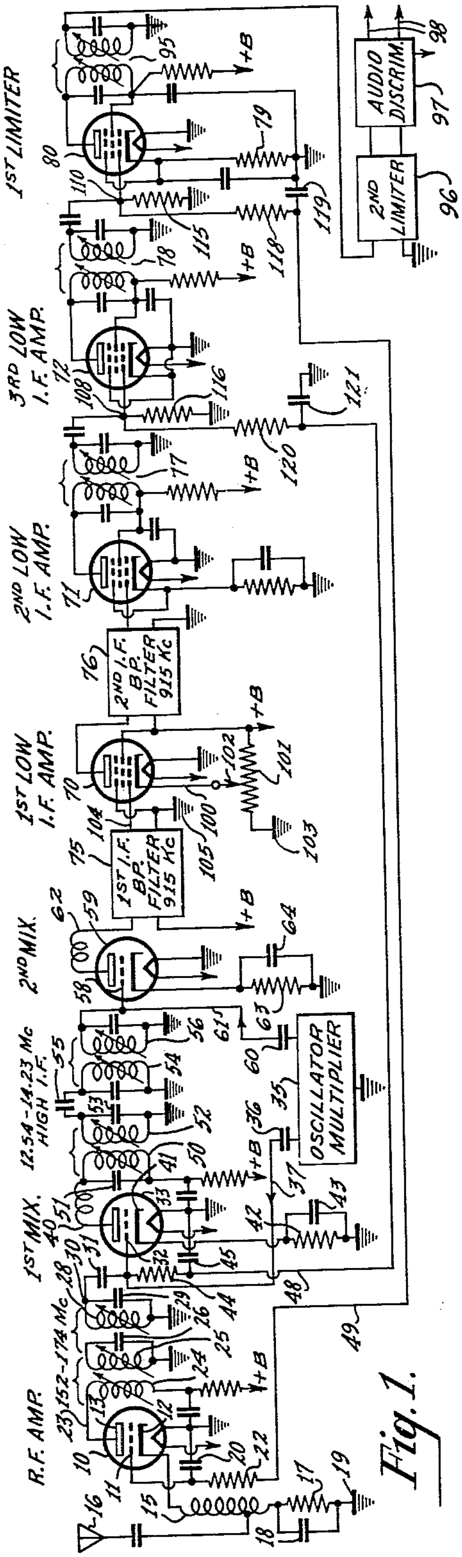
Figure 1 is a schematic circuit diagram of a high frequency signal receiving system embodying the invention.

Referring to Figure 1, a first R.-F. amplifier stage comprises a triode amplifier tube 10 having a control grid 11, a cathode 12, and an anode 13. The cathode 12 is coupled through an untuned input coupling transformer 15 with a source of high frequency signals, such as an antenna 16. The transformer is connected in circuit with a cathode resistor 17 and bypass capacitor 18, terminating in a connection to the ground conductor or low potential side of the system, indicated by the ground connection 19. The grid circuit for input signals is completed through a bypass capacitor 20 from the grid to ground, and biasing or control potentials are applied to the grid through an isolating grid resistor 22.

With the foregoing circuit, high frequency signals are applied between the grid and cathode and appear in an output anode circuit 23, connected with the anode 13. The output anode circuit includes a coupling winding 24, which is inductively, loosely coupled to a tuned circuit comprising a tuning inductor 25 and a shunt tuning capacitor 26. The tuned circuit 25—26 is, in turn, inductively, loosely coupled to a second tuned circuit comprising a second tuning inductor 28 and a shunt tuning capacitor 29. Both tuned circuits are connected to ground as indicated, and the high potential side or terminal 30 of the second tuned circuit is coupled through a suitable capacitor 31 with the control grid 32 of a first signal mixer tube 33.

Signals are also applied to the grid 32 from an oscillator multiplier 35, through a suitable coupling capacitor 36 and a supply lead 37, so that signals from the oscillator multiplier and from the input signal channel constituted by the R.-F. amplifier, are mixed to produce a high intermediate frequency in an output circuit 40 of the first mixer tube.

The cathode 41 of the first mixer tube is connected to ground through a suitable cathode resistor 42, having a bypass capacitor 43. The grid 32 is provided with a suitable grid resistor 44 and is bypassed to ground through a bypass capacitor 45. Both the mixer and the R.-F. amplifier tubes receive biasing potentials from their respective cathode resistors 42 and 17, through ground and circuits connected with two AGC control leads 48 and 49, as will hereinafter appear.

High intermediate-frequency signals appearing in the output anode circuit 40 of the first mixer stage are applied to a first tuned circuit comprising an inductor 50 and a shunt tuning capacitor 51, constituting the primary of a tuned coupling transformer, the secondary inductor 52 of which is tuned by a shunt capacitor 53. The primary 54 of a second tuned coupling transformer is capacity coupled through a small coupling capacitor 55 with the secondary 52 of the first transformer, and the tuned secondary 56 of the second transformer is connected to the signal or control grid 58 of a second triode mixer tube 59. The grid 58 is also coupled, through a suitable coupling capacitor 60 and signal supply lead 61, with the oscillator multiplier 35 to receive therefrom, along with the high intermediate-frequency signal, a suitable oscillator frequency to provide the desired low intermediate frequency after mixing in the output anode circuit 62. The second mixer is likewise biased by means of a cathode resistor 63, provided with a suitable bypass capacitor 64.

From the foregoing description, it will be seen that incoming signals are applied to a substantially grounded grid R.-F. amplifier which, in turn, is coupled to the first mixer through a selective coupling network comprising at least two tuned, loosely inductively coupled circuits, the first mixer is also coupled with a signal supply circuit to receive signals from the local oscillator source of high frequency. In the output circuit of the first mixer stage is provided a second, highly selective signal coupling network, comprising two tuned, intermediate-frequency coupling transformers, providing four tuned circuits in cascade, with highly selective capacity coupling between the secondary of the first transformer and the primary of the second transformer. The coupling circuits shown between the R.-F. amplifier and mixer, and between the first and second mixer stages, represent any suitable tunable coupling means having a relatively high degree of selectivity, whereby the resultant high intermediate-frequency signal at the second mixer grid is relatively free from other than adjacent and alternate channel interference, at least.

For a signal range of 152 to 174 mc., as indicated in the present example, the high intermediate frequency may be of the order of 12.54 to 14.23 mc. The R.-F. amplifier and two mixer tubes preferably may be of the triode type, the R.-F. amplifier 10, for example, being of the type known commercially as a 6J6 double triode, with the elements in parallel or one-half of the tube being used as a single triode. The triode mixer tubes 33 and 59 may be of the type known commercially as 6AB4.

The signal output from the output anode circuit 62 of the second mixer stage may be derived at any desired low intermediate frequency, such as 915 kc., for example, whereby more effective amplification may be obtained, together with a greater degree of selectivity in the coupling circuits between the various stages. In the present example, the intermediate-frequency amplifier comprises three stages represented by the three intermediate-frequency amplifier tubes 70, 71 and 72.

The coupling between the various stages of the low intermediate-frequency amplifier preferably are of the band-pass filter type, with a highly selective bandpass input filter 75 between the second mixer and the first intermediate-frequency amplifier tube 70, and a second highly selective bandpass filter 76 between the first stage low intermediate-frequency amplifier tube 70 and the second stage tube 71. However, the succeeding coupling means between the second and third low intermediate-frequency amplifier stages 71 and 72 may be a tuned-primary, tuned-secondary intermediate-frequency coupling transformer 77 and a similar coupling transformer 78 may be provided in the output stage of the low intermediate-frequency amplifier, in this case between the third low intermediate-frequency amplifier tube 72 and the succeeding first limiter stage comprising the amplifier tube 80. This is provided with a cathode bias resistor 79.

Figure 2:
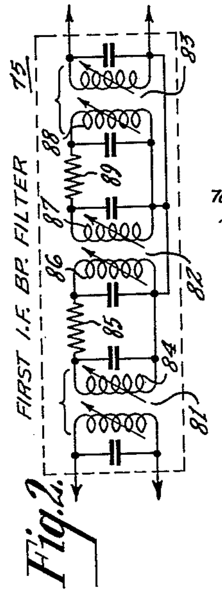
Figures 2 and 3 are schematic circuit diagrams of certain portions of the signal receiving system shown in Figure 1, for a further understanding of the operation thereof.
Figure 3:
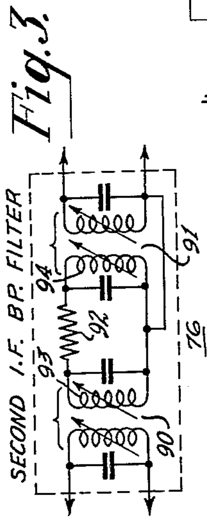

Referring to Figures 2 and 3, along with Figure 1, it will be seen that the first band-pass filter 75 in the low intermediate-frequency amplifier comprises a series of three tuned-primary, tuned-secondary intermediate-frequency coupling transformers 81, 82 and 83, the secondary 84 of the first transformer being coupled through a series coupling resistor 85 to the tuned primary 86 of the second coupling tarnsformer. Likewise, the tuned secondary 87 of the second transformer is coupled to the tuned primary 88 of the third transformer through a series coupling resistor 89. The circuits are inductively and resistively coupled to provide a relatively sharp band-pass characteristic to the coupling between the second mixer and the first intermediate-frequency amplifier stage provided by the tube 70.

The second intermediate-frequency band-pass filter 76 comprises a similar series of tuned coupling transformers, in this case two transformers 90 and 91, both having tuned primary and secondary windings responsive to the intermediate-frequency, and having a single coupling resistor 92 between the secondary 93 of the first transformer and the primary 94 of the second transformer. This is for the reason that a lesser degree of selectivity is required following the sharply tuned coupling provided by the first band-pass filter 75. The succeeding stages are coupled by sharply resonant I.-F. coupling transformers 77 and 78 preceding the first limiter 80 and this, in turn, is coupled through a sharply tuned I.-F. coupling transformer 95 having tuned primary and secondary windings and connected with the second limiter 96. The limiter, in turn, is followed by the usual audio frequency discriminator 97. An output circuit 98 for the discriminator supplies the audio frequency output for the system for use in any suitable utilizing means (not shown), such as an audio frequency amplifier and loud speaker, in the usual signal receiving system. Since the latter do not concern the invention, they are not shown for the sake of simplifying the drawings.

Referring now to the first low intermediate-frequency amplifier stage comprising the amplifier tube 70, it will be seen that a cathode lead 100 is connected to a suitable source of variable biasing potential comprising a potentiometer 101 having a movable contact arm 102 connected with the cathode. One end of the potentiometer 101 is connected to the positive B supply lead, while the opposite terminal is connected to ground as indicated at 103. The control grid circuit 104 of the amplifier tube 70 is likewise connected to ground as indicated at 105. Therefore, by adjustment of the contact 102 on the potentiometer 101, the bias potential on the first amplifier stage may be adjusted to adjust the overall gain of the low intermediate-frequency amplifier and the signal potential available at two control points 108 and 110 in the following signal-amplifying channel or signal path, for any given signal strength available at the input circuit or from the source of supply, such as the antenna 16.

The overall gain of the low intermediate-frequency amplifier is adjusted by varying the gain of the input stage in order to limit the signal strength applied to the low intermediate-frequency amplifier and to provide at the control terminals or points 108 and 110 certain signal potentials for overcoming the initial bias on two of the tubes, such as the third low intermediate-frequency amplifier tube 72 and the first limiter tube 80, at the grid terminals. In this manner, the tube 80 first overloads by drawing grid current at control point 110, when the signal voltage is sufficient to overcome the fixed grid bias provided by the cathode resistor 79, and upon a further increase in signal strength, the third low intermediate-frequency amplifier tube 72 draws grid current from the control point 108. In each case the grid circuit is completed through a grid resistor 115 for the tube 80 and a grid resistor 116 for the tube 72. These resistors are of such value that sufficient bias potential is developed for reducing the gain and cutting off the preceding R.-F. amplifier and first mixer tube grids upon operation of these tubes in drawing grid current beyond a predetermined high signal level.

The potential from the terminal 110 is applied back to the bias supply lead 49 for the R.-F. amplifier tube 10 through a filter resistor 118 and bypass capacitor 119, for removing all of the signal component from the lead 49 and delivering to the R.-F. amplifier only the D.-C. component of the rectified grid current from the tube 80. This control voltage adds to the normal fixed bias voltage provided by the resistor 17 and operates to reduce the gain of the R.-F. stage as the signal strength increases above the threshold value.

Likewise, the voltage developed by the tube 72 drawing grid current through the resistor 116, is applied to the bias supply lead 48 for the first mixer tube 33, through a suitable filter comprising a series resistor 120 and bypass capacitor 121 to ground. This control voltage likewise increases the bias voltage on the mixer grid and reduces the gain as the signal strength increases above the threshold value.

Figure 4:
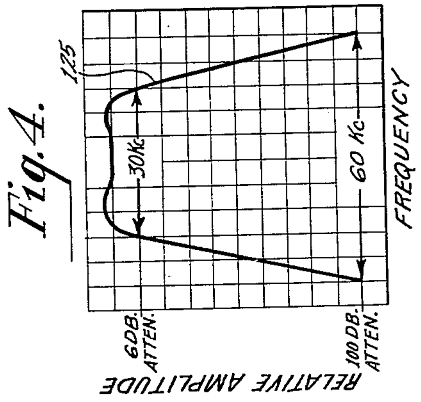
Figure 4 is a graph showing a certain response characteristic of the receiving system of Figure 1.

A high degree of selectivity is attained at the first operative AGC point 110 for the AGC system above described, as shown by the graph in Figure 4, to which attention is now directed. The curve 125 in Figure 4 shows the selectivity characteristic of the signal output from the coupling transformer 78 at the output end of the low intermediate-frequency amplifier. It will be noted that, for a 915 kc. intermediate-frequency amplifier, the response is 30 kc. wide for a 6 db attenuation, and is only 60 kc. wide for 100 db attenuation, thereby indicating the high degree of selectivity provided by the chain of amplifier stages and the bandpass filter coupling circuits therebetween.

This low intermediate-frequency selectivity is highly desirable in order that, in accordance with the invention, only the desired signal may have control of the first R.-F. amplifier stage, it being noted that the AGC control potential for the first R.-F. amplifier stage is derived from the first operative control point, where the signal strength is highest and the selectivity the greatest. The AGC potential for the first mixer tube is derived from a preceding or less advanced stage such as the third low intermediate-frequency amplifier stage, where the selectivity is not quite as great and where the signal strength is less for a given signal input potential.

It will also be seen that the system described provides for applying automatic gain control potential to the first mixer tube, in addition to the R.-F. amplifier tube, for further reduction of intermodulation interference, particularly the very great interfering signal levels where heretofore the desired signal may have been of the order of one-fifth to one-tenth of the signal strength of the interfering signals, to capture or control the receiving system.

A signal receiving system of the type shown in Figure 1 has resulted in a desired signal, of the order of $\frac{1}{2000}$ to $\frac{1}{5000}$ of the amplitude of the interfering signals which would produce intermodulation interference, capturing and controlling the receiving system when the interfering signals are very high in amplitude, that is, of the order of 0.1 volt input to the receiver. This circuit is particularly effective when the mixer tube is a triode as shown.

Furthermore, when the AGC potential or voltage for the first mixer stage is taken from a point in the signal amplifying channel of the receiving system prior to, or less advanced than, the point where the R.-F. amplifier control potential is derived, a material improvement in operation is obtained, in that the first mixer stage is permitted to function normally until a certain predetermined signal level is reached. Above this predetermined signal level, the control voltage is applied to the mixer grid, thereby reducing the gain of the system and its response to spurious intermodulation interference. This improvement, furthermore, prevents a reduction in mixer sensitivity prior to an input signal level where a reduction of the mixer gain and a change in mixer supplying parameters are desirable.

Summarizing the foregoing description of the operation, as the signal from the antenna increases and when it exceeds, at the advanced control point 110, the threshold value of fixed bias provided by the cathode resistor 79, the control voltage due to grid current through the resistor 116 gradually builds up as the signal increases, thereby reducing the gain of the R.-F. amplifier stage, which prevents the less advanced control point 108 from overloading until a high level of signal input occurs. At this point, AGC voltage is fed back from the control point 108 in the same manner, as the signal increases further, which reduces the gain of the first mixer and changes its operating parameters in such a way that intermodulation interference occurring in this stage, as well as in the second mixer, is further reduced.

Figure 5:
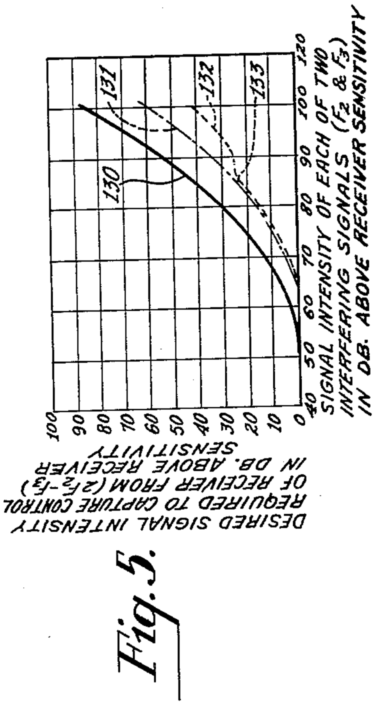
Figure 5 is a second graph showing a certain relation between the desired signal intensity and the intensity of interfering signals necessary for capture and control of the system shown in Figure 1, by a desired signal.

The overall operational results attained by the system described are further shown in the graph of Figure 5, to which attention is now directed, and wherein the response curve 130 indicates the operating characteristic of a receiver with no AGC control of the type described. Compared with this response are the curves 131 and 132, representing, respectively, AGC control from the point 110 on the first limiter back to the R.-F. amplifier alone, and the control of the receiver when both the R.-F. amplifier and first mixer are controlled from the control points 108 and 110 as described.

In the case of the joint control in accordance with curve 132, it will be seen that with selective AGC control, the desired signal intenstiy required to gain control of the receiver in db above the receiver sensitivity is relatively low with respect to the signal intensity of each of two interfering signals in db above the receiver sensitivity. In particular, it will be noted that point 133 on curve 132 is the operating level at which the bias supplied by control point 108 becomes effective, making it still possible to receive a desired signal 60 to 65 db below the level of the two interfering signals, fairly uniformly throughout the intensity range of the interfering signals. In this case, the two interfering signals referred to are those represented herein and described as F2 and F3, being the adjacent channel and alternate channel signals with respect to the desired signal F1.

From the foregoing description, it will be seen that the signal amplifying channel of the receiving system provides a high degree of signal selection at the input stages, namely, the R.-F. amplifier and first and second mixer stages, through the use of a grounded grid amplifier input circuit and highly selective coupling circuits between the R.-F. amplifier stage and the first mixer stage, and likewise between the first mixer stage and the second mixer stage. In addition, the main amplifying channel operates at a greatly reduced frequency which may be characterized as a low intermediate-frequency, and through a plurality of cascaded stages having a high degree of selectivity provided in the coupling means between stages, particularly at the input end of the low intermediate-frequency amplifier.

The AGC potentials are then derived from the signal channel following the high degree of signal selection, at two successive control points, so that the control voltages developed can only be controlled by the desired signal. Thus, for very weak signals, because of the threshold characteristic of the overloaded tubes at the selected points for AGC potential derivation the receiver has full sensitivity and the point of cut-off may be determined by adjustment of the amplifier or system gain, as in this case by adjustment of the control potentiometer 101, 102. Thus intermodulation interference is reduced to a point which enables adjacent channel operation in relatively high frequency bands, and allows a receiving system to capture and be controlled by a desired weaker signal when there are, for example, two strong interfering signals present on adjacent and alternate channels which would normally produce intermodulation interference.

What is claimed is:

1. In a high-frequency signal receiving system, the combination with a signal conveying channel comprising a radio-frequency amplifier stage, a succeeding mixer stage and successive signal stages, of means for applying automatic gain control potentials to said amplifier and mixer stages in sequence comprising, means for deriving automatic gain control potential in the system at one of said successive signal stages in said channel, said last named means being responsive to a predetermined low signal level for effecting application of automatic gain control potentials to said amplifier stage, and additional means at another of said signal stages successively less advanced in said signal conveying channel with respect to said mixer stage for deriving and effecting application of automatic gain control potentials to said mixer stage in response to a predetermined relatively high signal level.

2. In a high-frequency signal receiving system, the combination with a signal conveying channel comprising, a signal input stage and a succeeding signal translating stage, of a plurality of successive control points following said translating stage in said channel, automatic gain control potential deriving means at each of said control points, means providing circuit connections for applying automatic gain control potentials from one of said successive control points to said signal input stage, means providing further circuit connections for applying automatic gain control potentials from another one of said control points successively less advanced in said signal conveying channel with respect to said input stage respectively to said succeeding signal translating stage, and gain control means for controlling the signal level in said system, whereby said control points become operable in succession from said most advanced to the least advanced of said control points in response to predetermined successive increases in input signal level on said system.

3. In a high frequency signal receiving system, the combination as defined in claim 2, in which the signal input stage comprises a radio-frequency amplifier having input and output circuits, and in which the successive signal translating stages comprise a first mixer stage coupled to said output circuit through a selective band-pass network, a second mixer stage coupled to said first mixer stage through a second selective band-pass network, and in which a relatively low-frequency amplifier for the second mixer output is provided with highly selective band-pass interstage coupling, and in which said control points are located at successive stages in said amplifier.

4. In a high frequency signal receiving system, the combination as defined in claim 3, in which said radio frequency amplifier is a triode electronic tube amplifier of the cathode input type, and said first mixer stage comprises a second electronic triode tube.

5. A high-frequency, narrow-band receiving system, comprising in combination, a signal-input radio-frequency amplifier and first and second mixer stages, of a relatively low-frequency amplifying channel coupled to said second mixer stage, highly selective band-pass filter means in said low-frequency amplifying channel, signal conveying circuits providing two successive control points in said amplifying channel, a first automatic gain control potential deriving means coupling the successively more advanced of said control points with respect to said radio frequency amplifier to said radio-frequency amplifier, a second automatic gain control potential deriving means coupling the other of said cotnrol points to said first mixer stage, said potential deriving means being respectively operative to apply automatic gain control potentials from said one control point to said radio-frequency amplifier in response to a predetermined relatively low threshold signal level, and to apply automatic gain control potentials from the other of said control points to said first mixer stage in response to a predetermined relatively high threshold signal level.

6. In a high-frequency, narrow-band, multi-channel signal receiving system, the combination with a signal conveying channel comprising a signal-input radio-frequency amplifier and first and second mixer stages, of means for rendering said system unresponsive to intermodulation interference resulting from the beating of adjacent and alternate frequency channel signals of greater intensity than desired signals to produce spurious interfering signals of the frequency of said desired signals comprising, highly selective signal translating networks respectively coupling said amplifier and said mixer stages in cascade relation, a first and second successive points in said signal conveying channel, said first point successive to said second point in said signal channel relative to said radio frequency amplifier, first automatic gain control potential deriving means coupling said first operative point to said amplifier, second automatic gain control potential deriving means coupling said second operative point to said first mixer stage, and potentiometer means for adjusting said control potentials to values such that automatic gain control potenitals are applied to said amplifier from first operative point in response to a predetermined low signal level of said desired signals, thereby reducing the gain of said system as the input signal strength increases above said low signal level, and automatic gain control potentials are applied to said first mixer stage from said second operative point in response to a predetermined relatively higher signal level, thereby reducing the gain of said first mixer stage and avoiding overloading thereof, whereby said system is rendered responsive to said desired signals substantially to the exclusion of said spurious interfering signals.

7. A high-frequency, narrow-band, multi-channel signal receiving system having a relatively low response to intermodulation interference, comprising in combination, a grounded grid signal amplifier stage and succeeding first and second mixer stages of the triode electronic-tube type, means providing a multi-stage low intermediate-frequency amplifier having selective band-pass interstage coupling following said second mixer stage, means providing two signal responsive control potentials at successive control points in said system following said intermediate-frequency amplifier, a first automatic gain control circuit connecting one of said control points to said signal amplifier stage, a second automatic gain control circuit connecting another one of said control points to said first mixer stage, thereby to control the gain of said amplifier and mixer in succession, means for controlling the gain of said intermediate-frequency amplifier to provide predetermined automatic gain control potentials at each of said control points in response to a desired signal, and means at said more advanced control point to provide a gain control potential in response to a predetermined low signal level above a predetermined threshold value to effect gain reduction in said radio-frequency amplifier stage, and said less advanced control point being operative in response to a predetermined relatively higher signal level to effect reduction in gain of said first mixer stage, whereby optimum operation of said amplifier and mixer stages is provided at all signal levels.

References Cited in the file of this patent

UNITED STATES PATENTS

| | | |
|---|---|---|
| 1,508,354 | Scriven | Sept. 9, 1924 |
| 1,938,640 | Posthumus et al. | Dec. 12, 1933 |
| 2,071,733 | Curtis | Feb. 23, 1937 |
| 2,095,184 | Elliott | Oct. 5, 1937 |
| 2,095,406 | Barber | Oct. 12, 1937 |
| 2,120,974 | Foster | June 21, 1938 |
| 2,145,333 | Beers | Jan. 31, 1938 |
| 2,200,062 | Groeneveld | May 7, 1940 |
| 2,236,497 | Beers | Apr. 1, 1941 |
| 2,281,693 | Holst et al. | May 5, 1942 |
| 2,282,092 | Roberts | May 5, 1942 |
| 2,488,606 | Sands | Nov. 22, 1949 |
| 2,513,786 | Crosby | July 4, 1950 |